April 9, 1963　　E. N. ROSENBERG ET AL　　3,084,654
NON-MAGNETIC SEACYCLE FOR SCUBA DIVING
Filed Jan. 23, 1962　　2 Sheets-Sheet 1

INVENTORS
EDGER N. ROSENBERG
STEPHEN F. MORAN
BY
ATTORNEYS

INVENTORS
EDGAR N. ROSENBERG
STEPHEN F. MORAN
BY
ATTORNEYS

3,084,654
NON-MAGNETIC SEACYCLE FOR SCUBA DIVING
Edgar N. Rosenberg, 6914 Mission Gorge Road, San Diego 20, Calif., and Stephen F. Moran, 2617 Cowley Way, San Diego 10, Calif.
Filed Jan. 23, 1962, Ser. No. 168,289
12 Claims. (Cl. 114—16)
(Granted under Title 35, U.S. Code (1952), sec. 266)

The invention described herein may be manufactured and used by or for the Government of the United States of America for governmental purposes without the payment of any royalties thereon or therefor.

This invention relates to a nonmagnetic device for propelling scuba divers underwater. More specifically it comprises a seacycle or power driven vehicle adapted to be controlled by the submerged diver and to convey him in any desired direction underwater without magnetic or visual detection from the surface.

In the past such devices have been powered by electric motors energized through flexible cables connected to a power source at the surface. The disadvantages of such a vehicle are evident as a result of the limitations imposed by the length of cable and its poor maneuverability due to fouling. Storage batteries are sometimes used but require frequent recharging and the disadvantage of the gaseous hydrogen discharge must be provided for. In any electrical system separate air pressure tanks for blowing ballast are necessary. Inherent in any electrical system, magnetic fields are produced which, for example, make them subject to accidentally triggering magnetic mines during demolition operations. They are mainly vulnerable to any type of electronic detection and tracking, and, therefore, their use in such secret operations are questionable.

The object of this invention is to provide a seacycle designed to overcome the aforesaid disadvantages and provide an improved method of operation for accomplishing its general purpose.

The general purpose of the invention is to provide a power plant employing nonmagnetic materials and generating no electrical energy.

Specifically, one of the objects of the invention is to provide a pressure-volume gas engine cycle working on the principle of isothermal expansion, wherein a liquid or high pressure gas power source absorbs heat from the ocean or liquid in which the seacycle is operated, to balance the heat of expansion of the $CO_2$ in all the engine components from the power source to the exhaust.

Other objects of the power cycle components include means for preventing gas in liquid form from entering the system; means for increasing the rate of absorption of heat from the ocean by the gas supply and, thus, increase the heat exchange efficiency; means for varying the length of time the engine inlet valves are open for different power settings, thus, varying the amount of gas required for any particular power stroke whereby the maximum energy is obtained from the expanding gas at its highest available pressure level.

Another object is to provide means for blowing ballast rapidly from the basic gas power source or blowing ballast slowly and more economically with engine exhaust.

Still another object is to provide a dispersion ring provided with many orifices for breaking up the exhaust into numerous tiny bubbles whereby the bubbles are too far apart to reunite into a larger bubble and of a size small enough to be adsorbed by the surrounding liquid or sea water during their rise before reaching the ocean surface.

An object of the seacycle design is to provide means for the diver to change the horizontal direction of the sled by pivoting the gas engine and propeller thrust in a horizontal plane while controlling the vertical direction or roll by means of diving vanes independently rotated.

Still another object of the seacycle design is to provide universal suspension of the motor and propeller saddle on the main sled body whereby the diver may steer the sled in any direction through universal movement of the propeller in response to his hip and leg movement.

Another object is to provide a neutral buoyancy to the motor and propeller saddle to improve its operation.

Other objects and advantages will be pointed out or be apparent from the detailed description referring to the drawings in which.

Figure 1:
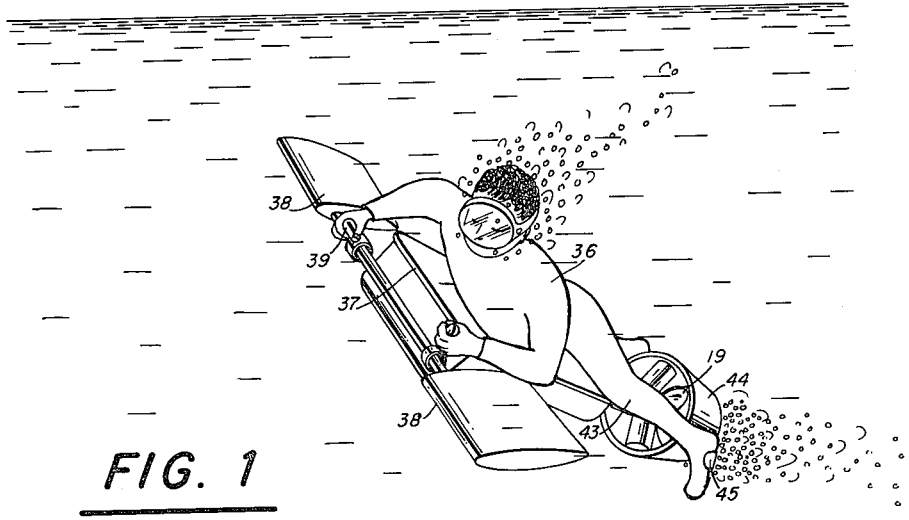
FIG. 1 is a perspective view of a scuba diver on the proposed seacycle.

In detail, FIG. 1 shows a scuba diver 36 riding the proposed seacycle in a prone position on the sled main frame 37. The horizontal direction of the seacycle is controlled manually by the diver's waist and leg motion, which in turn swing the motor and propeller 19 about the vertical pivot or spindle 41. The vertical direction or roll of the vehicle is controlled by the fins or driving vanes 38.

Figure 2:
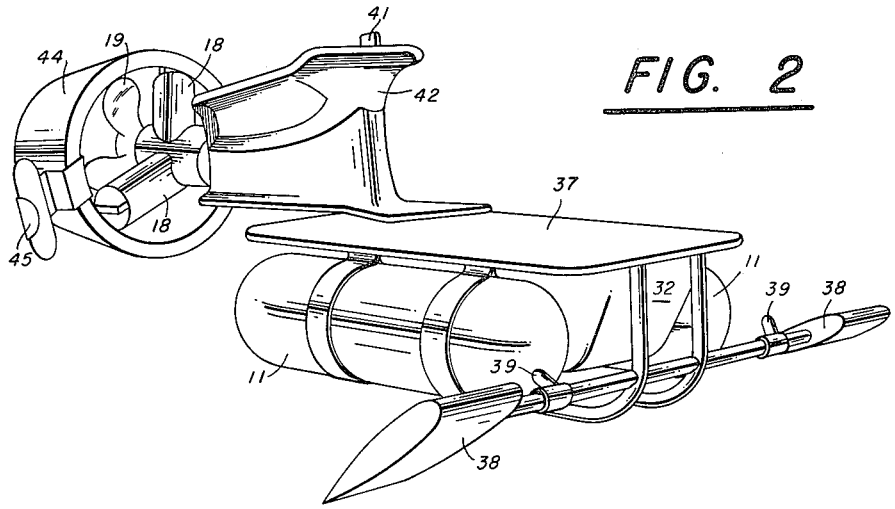
FIG. 2 is a perspective view of the seacycle showing the assembled components.

FIG. 2 illustrates the vanes 38 more clearly as manually and independently operated by handles 39. A joy stick control has been used for operating both vanes 38 with one hand, thus freeing the other hand for different functions. The various components are mounted on the main frame 37 or sled platform on which the diver lies in a prone position with his legs straddling the saddle 42.

The saddle 42 is rotatively supported on vertical spindle 41. The engine 18 is mounted on the saddle 42 and drives a propeller 19 partially enclosed within a Kort nozzle 44 for protection and efficiency. The foot pads 45 are pivoted to the Kort nozzle and provide foot support for the diver and to assist in steering the sled by rotating the saddle 42 through the desired angle. The pivoted foot pads 45 are linked to the manual operating level 21 for shifting the variable cut-off valve cam 33 by means of the diver's foot control.

The engine 18 is a gas driven piston motor working on the theory of isothermal expansion. The gas power source is contained in the pressure tanks 11 which are also connected through control valves to the water ballast tank 32 as described in the schematic FIG. 4.

Figure 3:
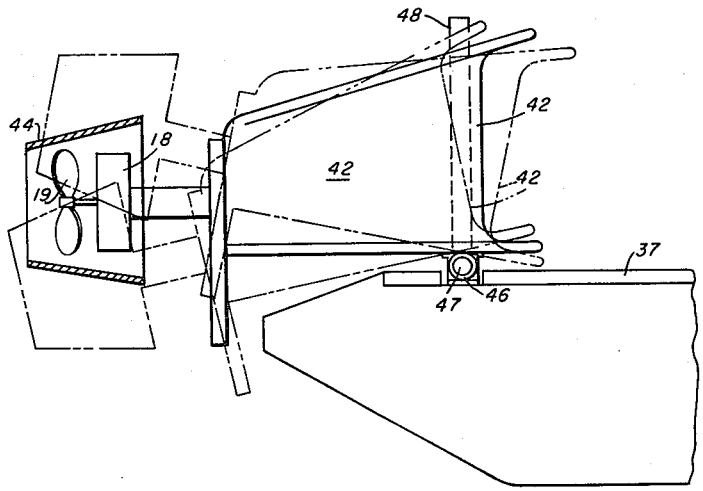
FIG. 3 is a front elevation of the rear portion of the seacycle showing the motor saddle universally mounted on the sled body.

FIG. 3 is a modification of FIG. 2 and provides a saddle which is universally suspended by a vertical spindle 48 pivoted at 47 to the main frame 37 in contrast to being only horizontally supported by the vertical spindle 41, FIG. 2. In FIG. 3 the universal support is provided by a horizontal pivot 47 fixed to main frame 37. A vertical spindle 48 is, in turn, pivoted to 47 and the saddle 42 FIG. 3 pivoted on spindle 48. By hip and leg movement of the diver the propeller thrust can be controlled with the universal support so as to steer the seacycle in any direction desired.

To facilitate diver steering, by means of saddle direction control, through the universal coupling to the main frame, it is evident that neutral buoyance of the saddle and components would be desirable. I propose, beside employing light-weight materials in the saddle 42 and motor 18, to provide a hollow Kort nozzle 44 to provide the main buoyancy. By use of the universal saddle the fins or diving vanes may be made smaller or practically eliminated for roll control.

Figure 4:
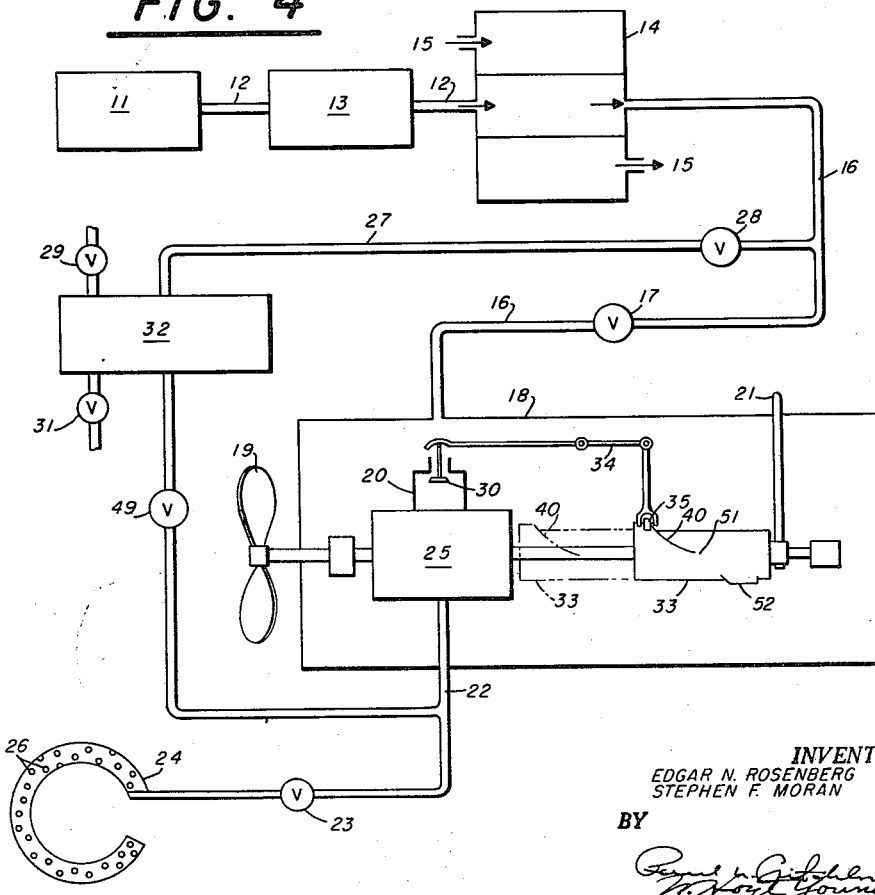
FIG. 4 is a schematic diagram showing the seacycle power plant.

In FIG. 4 a schematic of the power cycle is illustrated wherein all components and parts are made of nonmagnetic materials so that no magnetic field is set up permitting electronic detection or capable of accidentally energizing a monitoring circuit such as setting off a magnetic mine. The schematic illustrated in FIG. 4 comprises a high pressure gas power source 11. Preferably the power source is a supply tank 11 of liquid or compressed carbondioxide connected through various components to a $CO_2$ engine 18. The liquid $CO_2$ in tank 11 is heated by the surrounding sea water causing it to boil off or vaporize as it is discharged from the tank 11. Any slugs of liquid escaping from the tank 11 will be tentatively blocked by the separator until vaporized before passing to the heat exchanger. In the heat exchanger the sea water will increase the $CO_2$ gas temperature and pressure further to improve the efficiency. The entire system including the components, is designed for isothermal expansion of the liquid or high pressure $CO_2$ wherein the heat of vaporization or expansion is supplied by the liquid in which the seacycle operates, usually the ocean.

The gas power source 11 is connected by pipe 12 to a liquid separator 13 for blocking the passage of liquid $CO_2$ into the heat exchanger 14 where sea water 15 circulates through the exchanger and transfers its heat to the $CO_2$ thus increasing its operating pressure and efficiency. From the heat exchanger 14 the $CO_2$ gas is carried by the feed line 16 through shut-off valve 17 to the engine 18.

Within the engine block diagram 18 the major features of the $CO_2$ engine includes a cylinder 20 and crank case 25. Gas pressure is supplied from the gas power source 11 through line 16 by variable cut-off intake valve 30 to cylinder 20, and is exhausted through crank case 25, exhaust line 22, exhaust shroud 24 into the surrounding medium. The exhaust line is connected to the crank case 25 to maintain the case under positive pressure and prevent the surrounding liquid medium from leaking into the crank case. Exhaust line 22 is connected through check valve 23 to the exhaust shroud 24 a ring shaped chamber perforated with a plurality of holes 26 of a size and spacing to prevent the exhaust bubbles from uniting to form larger bubbles as they raise to the surface. By employing $CO_2$ as the power supply medium, the exhaust bubbles will be dissolved or absorbed by the sea water before reaching the ocean surface, providing the bubbles are small enough. Therefore, the spacing and size of the shroud holes 26 are important and should be determined according to depth of operation. The preferred size of holes 26 is 1/64 of an inch in diameter and the spacing is 1/4 inch apart.

In order to obtain economy and maximum efficiency of operation a variable cut-off valve linkage is desirable. Such a basic type system is shown schematically in FIG. 4. Each cylinder of the $CO_2$ motor would be provided with a valve 30 operated through its rocker arm 34 and follower 35 from a common cam 33. Cam 33 is of tubular design and splined for axial displacement on the cam shaft shown as an extension of the main shaft by means of manual lever 21. The cam land 40 is high for full opening and the delay to cut-off will depend on the high peripheral surface being longer at the left and gradually reducing to the right at point 51 where the valve 30 remains closed as the cam 33 is shifted to the left.

When the cam 33 is moved to the extreme left the land 52 which is 180 degrees rotated from forward cam 40, is in contact with the follower 35 and the valve opening causes the engine to reverse. The reversing land 52 is axially parallel to the shaft as compared with the forward section 40 in which the closing area is normally spiral in shape to provide the variable cut-off. With such a valve operation the diver is able to admit the operating fluid at full working pressure for the piston travel up to the selected cut-off, thereby greatly improving the economy and providing more responsive control of the thrust.

Other features include the ballast operation. The ballast tank 32 is provided with the usual inlet 29 and outlet 30 valves for blowing ballast. The blowing of ballast may be accomplished by opening valve 28 and admitting live high pressure gas through line 27. A second source of ballast control provided for economy during operation is by means of the exhaust gases through line 22 and valve 49, which is also connected to crank case 25 to maintain it under positive pressure and prevent sea water from entering the case by leakage.

A three cylinder radial motor is preferred so that three hundred sixty degree thrust can be delivered to the propeller 19. Each cylinder could then provide thrust through 120° to 180° of rotation thus providing continuous thrust through 360°. With the three cylinders of engine 18, FIG. 2, and one valve 30 and linkage 34, 35 for each cylinder, the common valve cam 33 controlled by the diver through lever 21 could readily control the rotation of the motor and propeller at any point in the 360° swing.

Obviously many modifications and variations of the present invention are possible in the light of the above teachings. It is therefore to be understood that within the scope of the appended claims the invention may be practiced otherwise than as specifically described.

Having described our invention, what we claim is:

1. A scuba diver propulsion vehicle submerged in a supporting liquid medium and adapted for conveying divers underwater in any desired direction subject to their control, comprising a main frame structure for supporting a diver's body in a normally prone position, a gas power source mounted on said frame, said source being filled with a gas soluble in water, a gas motor connected to said power source, water ballast tanks mounted on said frame and connected to said gas source, a propeller operably connected to said motor, and a variable cut-off valve and linkage for diver control of the motor speed and direction of rotation, all structural and operating parts of said vehicle being made of non-magnetic elements and materials so that magnetic excitation and detection are prevented.

2. A device as described in claim 1 wherein said gas power source is a liquid gas filled tank submerged in the liquid medium supporting the vehicle and in heat conductive contact therewith so that heat of expansion of said gas will be supplied by the liquid medium and wherein the connection of the gas power source to the motor includes a liquid separator and a heat exchanger so that liquid fuel will be blocked from passing into the exchanger, said heat exchanger having its external surface in heat conductive contact with the liquid medium in which the vehicle is submerged so that higher pressure and thermal efficiency can be attained.

3. A device as described in claim 1 wherein said motor is of the reciprocating type and the variable cutoff valve is linked to a rotating cam of tubular design splined on the cam shaft and means for axially shifting said cam so that speed and thrust may be varied according to power demand at the selected intake cut-off for greatest efficiency.

4. A device as described in claim 1 wherein the motor is of the reciprocating type provided with a crank case and the exhaust from said motor discharges into said supporting liquid medium, said exhaust communicates with the crank case of said motor so that the crank case is maintained at a positive pressure in relation to the hydrostatic pressure of the surrounding liquid medium.

5. A device as described in claim 4 wherein a check valve is located in the exhaust line adjacent the point of discharge so that the surrounding liquid medium will be blocked from entering the system in case of an internal pressure drop.

6. A device as described in claim 1 wherein the gas from said gas powered source is preferably carbon dioxide.

7. A device as described in claim 1 wherein the exhaust from said motor is directed through a dispersion unit before discharging into the supporting liquid medium, said dispersion unit comprising a chamber perforated with a plurality of small exhaust ports spaced so that the plurality of exhaust bubbles would remain separated and can be absorbed by the water as they rose toward the surface.

8. A device as described in claim 7 wherein said small exhaust ports are preferably one sixty-fourth of an inch in diameter and their spacing is one-fourth of an inch apart.

9. A device as described in claim 1 wherein said water ballast tank mounted on said frame and provided with diver controlled flood and discharge valves, including means connecting the gas power source to said ballast tank for employing live high pressure gas for blowing ballast rapidly, and an exhaust gas line from the motor crank case to said tank so that the exhaust gases may be utilized for blowing ballast economically while underway.

10. A device as described in claim 1 wherein said gas motor and propeller are mounted on a saddle straddled by the diver's legs when in his normally prone position, said saddle being universally mounted on said main frame so that the diver may control the vehicle in a vertical and horizontal direction by his hip and leg movements.

11. A device as described in claim 10 including means attached to said saddle to counteract its suspended weight and produce approximately neutral buoyancy.

12. A device as described in claim 11 wherein the means attached to said saddle to produce neutral buoyancy comprises a buoyant Kort nozzle encircling said propeller.

References Cited in the file of this patent

UNITED STATES PATENTS

| | | |
|---|---|---|
| 180,478 | Hill | Aug. 1, 1876 |
| 611,792 | Ofeldt | Oct. 4, 1898 |
| 729,313 | Fenton | May 26, 1903 |
| 730,042 | Okun | June 2, 1903 |
| 2,918,889 | Rebikoff | Dec. 29, 1959 |

FOREIGN PATENTS

| | | |
|---|---|---|
| 21,132 | Germany | Feb. 28, 1882 |
| 105,495 | Great Britain | Aug. 19, 1917 |
| 1,244,964 | France | Sept. 26, 1960 |